United States Patent
Hengstenberg et al.

(10) Patent No.: US 11,618,484 B2
(45) Date of Patent: Apr. 4, 2023

(54) CUSTOMER-SPECIFIC VEHICLE DOOR LEAF, FOR EXAMPLE FOR A RAIL VEHICLE

(71) Applicant: SIEMENS MOBILITY GMBH, Munich (DE)

(72) Inventors: Thomas Hengstenberg, Groebenzell (DE); Herbert Kammerloher, Biburg (DE); Thomas Wimberger, Freising (DE)

(73) Assignee: Siemens Mobility GmbH, Munich (DE)

( * ) Notice: Subject to any disclaimer, the term of this patent is extended or adjusted under 35 U.S.C. 154(b) by 428 days.

(21) Appl. No.: 16/652,144

(22) PCT Filed: Sep. 25, 2018

(86) PCT No.: PCT/EP2018/076022
§ 371 (c)(1),
(2) Date: Mar. 30, 2020

(87) PCT Pub. No.: WO2019/063568
PCT Pub. Date: Apr. 4, 2019

(65) Prior Publication Data
US 2020/0247436 A1 Aug. 6, 2020

(30) Foreign Application Priority Data

Sep. 29, 2017 (DE) .......................... 102017217360.2

(51) Int. Cl.
*B61D 19/02* (2006.01)
*B60J 5/04* (2006.01)
(Continued)

(52) U.S. Cl.
CPC ............ *B61D 19/02* (2013.01); *B60J 5/0408* (2013.01); *E06B 3/70* (2013.01); *B61D 19/00* (2013.01);
(Continued)

(58) Field of Classification Search
CPC ........ B61D 19/00; B61D 19/02; B60J 5/0408; B60J 5/0463; B60J 5/048; E06B 3/00;
(Continued)

(56) References Cited

U.S. PATENT DOCUMENTS

| | | | | |
|---|---|---|---|---|
| 3,375,030 A | * | 3/1968 | Thompson | B62D 33/044 403/231 |
| 3,561,801 A | * | 2/1971 | Chiu | F16B 7/0446 403/264 |

(Continued)

FOREIGN PATENT DOCUMENTS

| | | | | |
|---|---|---|---|---|
| AT | 412226 B | * | 10/2004 | E06B 5/16 |
| CN | 201214417 Y | | 4/2009 | |

(Continued)

OTHER PUBLICATIONS

Chen et al., "Door plate structure of high-speed train sliding plug door", Jul. 1, 2015, Chinese Patent Office, Edition: CN104747025A (Year: 2015).*

(Continued)

*Primary Examiner* — Dennis H Pedder
*Assistant Examiner* — Joyce Eileen Hill
(74) *Attorney, Agent, or Firm* — Laurence A. Greenberg; Werner H. Stemer; Ralph E. Locher

(57) ABSTRACT

A customer-specific vehicle door leaf, in particular a customer-specific rail-vehicle door leaf, preferably an inwardly opening customer-specific vehicle door leaf for an entry door. The door leaf includes a panel and a general vehicle door leaf, wherein the general vehicle door leaf preferably has a supporting vehicle door leaf frame, and the general vehicle door leaf itself is pressure-tight and/or waterproof, and the panel is provided on the vehicle door leaf frame.

9 Claims, 5 Drawing Sheets

(51) Int. Cl.
　　　*E06B 3/70*　　　(2006.01)
　　　*E06B 3/88*　　　(2006.01)
　　　*E06B 3/82*　　　(2006.01)
　　　*B61D 19/00*　　(2006.01)

(52) U.S. Cl.
　　　CPC ............... *E06B 3/822* (2013.01); *E06B 3/88* (2013.01); *E06B 2003/708* (2013.01)

(58) Field of Classification Search
　　　CPC ..... E06B 3/70; E06B 3/88; E06B 3/96; E06B 3/822; E06B 3/968; E06B 3/9616; E06B 3/9646; E06B 3/7015; E06B 3/76; E06B 2003/708; E06B 2003/7059; E06B 2003/7074; E06B 2003/7082; E06B 2003/7092; E06B 1/347; B29C 65/48; B29L 2031/3064; E05Y 2900/51; E05Y 2900/531
　　　USPC ..... 105/343; 296/146.1, 146.2, 146.5, 146.7, 296/146.9
　　　See application file for complete search history.

(56) References Cited

U.S. PATENT DOCUMENTS

| | | | | |
|---|---|---|---|---|
| 3,816,011 | A * | 6/1974 | Biebuyck | E06B 3/9636 403/187 |
| 5,924,259 | A * | 7/1999 | Marousek | E04F 19/064 52/287.1 |
| 2014/0290529 | A1* | 10/2014 | Tazreiter | B61D 25/00 105/396 |
| 2015/0113904 | A1* | 4/2015 | Sprague | E06B 3/70 52/656.9 |

FOREIGN PATENT DOCUMENTS

| | | | |
|---|---|---|---|
| CN | 202439700 U | 9/2012 | |
| CN | 104747025 A * | 7/2015 | |
| CN | 205063758 U * | 3/2016 | |
| CN | 107187066 A | 9/2017 | |
| DE | 4407731 A1 | 9/1995 | |
| DE | 102008021224 A1 | 11/2009 | |
| EP | 0725203 A1 * | 7/1996 | ............ E06B 1/52 |
| EP | 792992 A1 * | 9/1997 | ............ E06B 1/347 |
| EP | 2799305 A2 | 11/2014 | |
| FR | 2729738 A1 * | 7/1996 | ......... E06B 3/9646 |
| JP | 2002047865 A * | 2/2002 | |

OTHER PUBLICATIONS

Chen et al. "Locomotive cab access door of sliding window is carried in area", Mar. 2, 2016, Chinese Patent Office, Edition: CN205063758U (Year: 2016).*

Budich et al., "Retrofit door frame", Sep. 9, 1997, European Patent Office, Edition: EP0792992A1 (Year: 1997).*

Nakazawa et al., "Method of Fixing Window Glass for Vehicle, and Window Structure By the Method", Feb. 15, 2002, Japanese Patent Office, Edition: JP2002047865A (Year: 2002).*

Niemann et al. "Reinforcement of doors, windows or facades", Jul. 8, 1996, European Patent Office, Edition: EP0725203A1 (Year: 1996).*

Ambonati et al., "Hollow square profile assembly, e.g. for panel bodies, window frames, etc.", Jul. 26, 1996, European Patent Office, Edition: FR2729738A1 (Year: 1996).*

Voelkl, "Fire Protection Door or DGL", Nov. 25, 2004, European Patent Office, Edition: AT412226B (Year: 2004).*

\* cited by examiner

CUSTOMER-SPECIFIC VEHICLE DOOR LEAF, FOR EXAMPLE FOR A RAIL VEHICLE

BACKGROUND OF THE INVENTION

Field of the Invention

The invention relates to a customer-specific vehicle door leaf, in particular a customer-specific rail vehicle door leaf, preferably an inwardly opening vehicle door leaf for an access door. Furthermore, the invention relates to a vehicle, in particular a rail vehicle, preferably a locomotive.

In the case of a known rail vehicle door, a load-bearing rail vehicle door leaf frame of a rail vehicle door leaf of the rail vehicle door and an exterior panel of the rail vehicle door leaf are connected to one another in a substantially non-releasable manner by means of an adhesive bond. For this purpose, a manufacturer has to show a high quality qualification for adhesive bonding methods. In order for it to be possible for paintwork of the exterior panel to be changed if required in the case of a rail vehicle door leaf which has already been finished, complicated work is required (masking, possibly removing of seals or even dismantling of the rail vehicle door leaf from a railway carbody).

Retroactively, painting can always be carried out only as far as existing glue lines (for example, that of an integrated window frame). In addition to an unpleasant visual appearance (exact masking is difficult), there is always the risk here that a paint does not adhere correctly, since a substrate is not capable of accepting paint correctly because roughening as far as into a glue line is not possible and/or paintwork which is produced should run as far as up to/below the glue line. Furthermore, there is the risk that corrosion problems occur more rapidly if a roughened surface is not covered completely by a new top coat.

SUMMARY OF THE INVENTION

It is an object of the invention for it to be possible for the manufacturing and operating costs (LCC: Life Cycle Costing) for a rail vehicle to be lowered comparatively quickly in the region of a rail vehicle door, that is to say without it being necessary in the process for a construction of the rail vehicle to be interfered with deeply. Since operations on a rail vehicle door leaf can be implemented only with comparative difficulty, the costs are to be lowered in some other way: a functionality of the rail vehicle door is to remain at least constant.

The object of the invention is achieved by means of a customer-specific vehicle door leaf, in particular a customer-specific rail vehicle door leaf, preferably an inwardly opening customer-specific vehicle door leaf for an access door; and by means of a vehicle, in particular a rail vehicle, preferably a locomotive, such as a freight train locomotive. Advantageous developments, additional features and/or advantages of the invention result from the dependent patent claims and/or the following description of the invention.

The customer-specific vehicle door leaf according to the invention comprises a panel and a general vehicle door leaf, the general vehicle door leaf preferably having one load-bearing vehicle door leaf frame, and the general vehicle door leaf itself being of pressure-tight and/or water-tight configuration, and the panel being provided on the vehicle door leaf frame. Instead of a load-bearing vehicle door leaf frame, another construction of the vehicle door leaf can also be used, such as a flat construction.

That is to say, the general vehicle door leaf does not yet have a panel, in particular does not yet have an exterior panel. Only the general vehicle door leaf and the panel, in particular the exterior panel, together form the customer-specific vehicle door leaf. The customer-specific vehicle door leaf therefore differs from the general vehicle door leaf at least by way of the panel, in particular at least the exterior panel. Furthermore, for example, an interior trim panel can belong to a customer-specific vehicle door leaf. In accordance with the invention, a single panel, in particular a single exterior panel, or a plurality of panels, in particular a plurality of exterior panels, can be provided on the vehicle door leaf frame.

Furthermore, a customer-specific vehicle door leaf is to be understood to mean a vehicle door leaf which has the property of being designed simply in accordance with a request of a customer. The customer-specific vehicle door leaf is actually rather a proto-customer-specific vehicle door leaf, since a customer-specific vehicle door leaf firstly has the suitability of being designed or redesigned simply in accordance with the request of the customer and is not yet designed in this way (paintwork). In accordance with the invention, the panel, in particular the exterior panel, can be dismantled independently from the vehicle door leaf, can be roughened completely and cleanly, and can be painted or repainted. Moreover, a damaged exterior panel can be swapped rapidly and without problems, without it being necessary for the entire vehicle door leaf to be swapped.

In one embodiment, the panel is provided as an exterior panel on the outside of the general vehicle door leaf or of the vehicle door leaf frame. The panel can be provided as a panel which can be dismantled simply on the general vehicle door leaf or on the vehicle door leaf frame. A mechanical connection of the panel to the general vehicle door leaf or to the vehicle door leaf frame can be of simply releasable configuration. That is to say, the panel can be dismantled from the general vehicle door leaf without damage or destruction of a part of the general vehicle door leaf, which part is connected to the panel.

Here, the panel can be screwed, plugged (for example, by means of spring clips), adhesively bonded and/or fastened in some other way in a readily exchangeable manner to the general vehicle door leaf or the vehicle door leaf frame. Furthermore, a thermal insulation can be provided between the panel and the general vehicle door leaf or the vehicle door leaf frame. Moreover, the panel can be configured as an aluminum sandwich panel or a GFRP panel.

In one embodiment, furthermore, the customer-specific vehicle door leaf can have an interior trim panel. Furthermore, in one embodiment, the general vehicle door leaf can be configured as a substantially completely functional vehicle door leaf. That is to say, the general vehicle door leaf is fully mechanically functional without its customer-specific configuration and/or without a panel, and might be used as intended (apart from its visual function). Furthermore, the general vehicle door leaf can have a window, in particular a stowage shaft window including a mechanism; a plug-on seal; an interior trim panel; a bearing device and/or a recess for a lock device, etc. Moreover, in one embodiment, the vehicle door leaf frame itself can be of pressure-tight and/or water-tight configuration.

In one embodiment, the vehicle door leaf frame has a plurality of (in particular, four or precisely four) frame hollow profiles which constitute the actual vehicle door leaf frame. Here, the frame hollow profiles can be produced from two (in particular, precisely two) different original hollow profiles or proto-hollow profiles. Here, in all embodiments of the invention, one, a plurality of or all frame hollow profiles can be substituted by one or a plurality of frame profiles.

Frame hollow profiles which relate to one another can be plugged and/or fitted into one another in a corner region of the vehicle door leaf frame. It is preferred here to plug and/or fit the frame hollow profiles which relate to one another into one another in all four corner regions. Furthermore, frame hollow profiles which relate to one another can be riveted (preferably in one embodiment), screwed (preferably in one embodiment), welded and/or connected to one another by way of any other joining method, the functional principle of which is based on doubling up of sheet metal, in a corner region of the vehicle door leaf frame. It is preferred here to rivet, to screw and/or to weld the frame hollow profiles which relate to one another to one another in all four corner regions.

Seal edges which relate to one another of frame hollow profiles which relate to one another can be substantially flush in the circumferential direction of the vehicle door leaf frame. As a result, completely circumferential door seals and a completely circumferential window seal can be realized. In one embodiment, the panel covers a corner region of the vehicle door leaf frame. It is preferred here to cover all four corner regions by means of the/a panel. Furthermore, the panel is preferably cut out in a window region of the customer-specific vehicle door leaf. In one embodiment, the panel covers substantially the entire general vehicle door leaf on one side, in particular an outer side.

The frame hollow profiles can comprise two or, in particular, precisely two inner frame hollow profiles and two or, in particular, precisely two outer frame hollow profiles. Here, the inner frame hollow profiles can be of substantially identical configuration, and/or the outer frame hollow profiles can be of substantially identical configuration. In one embodiment, a longitudinal end section of a base profile (see below) of an inner frame hollow profile is received between two side walls of an outer frame hollow profile.

Here, the relevant longitudinal end section of the base profile (machined, preferably stepped) of the inner frame hollow profile can be received, in particular without at least one section of a profile web and/or without at least one section of a profile limb, in each case between two relevant side walls which lie opposite one another of the relevant outer frame hollow profile, the base profile of the inner frame hollow profile preferably being seated mainly or substantially on a relevant base profile of the outer frame hollow profile. Apart from fastening means, the relevant longitudinal end section of the inner frame hollow profile is restrained here in at least two, preferably in three, translational directions, and is preferably received partially in a positively locking manner in the relevant longitudinal end section of the outer frame hollow profile.

In one embodiment, profile webs which relate to one another and/or profile limbs which relate to one another of the frame hollow profiles can be substantially flush in the circumferential direction of the vehicle door leaf frame. That is to say, all profile webs which relate to one another of the frame hollow profiles lie in each case substantially in one plane. Here, all the radially outer, front profile webs and all the radially inner, front profile limbs can lie substantially in one plane. Furthermore, profile webs which relate to one another and/or profile limbs which relate to one another of frame hollow profiles which relate to one another can be fitted in a mechanical contact region.

In one embodiment, a single frame hollow profile or the two relevant frame hollow profiles can have a radius in a corner region of the vehicle door leaf frame. The radius serves to guide the respective seal around on/in the vehicle door leaf frame. In accordance with the invention, two different frame hollow profiles are preferably plugged into one another, are preferably fitted and preferably riveted, no offset being produced at the radii. The respective radius can serve as a plug-in lug for a seal, in particular a plug-on seal. Furthermore, the outer frame hollow profiles can substantially have the radii for at least one door seal. Furthermore, all of the frame hollow profiles in the regions which relate to one another can constitute the radii for a window seal.

In one embodiment, all of the radially outer and front profile webs of the frame hollow profiles can have a substantially completely circumferential seal edge for a front door seal. Furthermore, all of the radially outer and rear profile webs of the frame hollow profiles can have a substantially completely circumferential seal edge for a rear door seal. Furthermore, all of the radially inner and front profile limbs of the frame hollow profiles can have a substantially completely circumferential seal edge for a window seal.

Moreover, at least one outer and/or at least one inner seal edge of the frame hollow profiles can have grooving. That is to say, a plurality of or all outer seal edges and/or a plurality of or all inner seal edges can have grooving. In one embodiment, the vehicle door leaf frame is configured as a completely circumferential profile frame. Moreover, the original hollow profiles or the frame hollow profiles are preferably extruded.

In one embodiment, the two horizontal frame hollow profiles are of substantially mirror-symmetrical configuration with respect to one another in substantially all sectional planes of the vehicle door leaf frame or are set up in the vehicle door leaf frame, the sectional planes being defined by a width axis and a vertical axis of the vehicle door leaf frame. This can apply analogously to the vertical frame hollow profiles. In one embodiment of the invention, the rough vehicle door leaf frame (for example, apart from fastening devices (through holes for thrust plate, center strut, etc.), a recess for a lock device, a bearing device, a removed material portion, etc.) can be of rotationally symmetrical configuration by approximately 180° with regard to its thickness axis; this can apply analogously to the horizontal and/or vertical frame hollow profiles. Furthermore, the rough vehicle door leaf frame can be of substantially point-symmetrical configuration in substantially all sectional planes which are defined by its width axis and its vertical axis.

In one embodiment, the general vehicle door leaf can have a preferably beaded thrust plate at least on one side and/or an optionally beaded center strut at least on one side. Here, the thrust plate and/or the center strut can preferably be set up between the vertical frame hollow profiles of the vehicle door leaf frame. That is to say, the vehicle door leaf can have a preferably beaded thrust plate and/or a center strut on both sides, that is to say also on an inner side in addition to an outer side.

The thrust plate and/or the center strut can be riveted (preferably in one embodiment), screwed (preferably in one embodiment), welded and/or connected by way of any other joining method, the functional principle of which is based on doubling up of sheet metal, to a frame hollow profile at least on one side. That is to say, the thrust plate and/or the center strut can be riveted, screwed and/or welded to the frame hollow profiles on both sides. Moreover, the thrust plate can be riveted, screwed and/or welded to the third frame hollow profile which relates to it.

In one embodiment, sealing compound can be provided between the thrust plate and/or the center strut and at least one frame hollow profile. That is to say, sealing compound can be provided between the thrust plate and/or the center strut and the two frame hollow profiles. Sealing compound can of course likewise be provided between the thrust plate and the abovementioned third frame hollow profile. Here and in the following text, "between" is to mean that the sealing compound is provided firstly on a surface of a first part and secondly on an edge of a part, that is to say not as a sandwich consisting of three layers.

Furthermore, the thrust plate and/or the center strut and at least one frame hollow profile can be coated. Furthermore, the center strut can be riveted, screwed, welded and/or connected by way of any other joining method, the functional principle of which is based on doubling up of sheet metal, to the thrust plate. Moreover, sealing compound can be provided between the thrust plate and the center strut. In embodiments, at least one entire (large-area) side, in particular at least the entire outer side, of the vehicle door leaf is coated.

The vehicle according to the invention has a customer-specific vehicle door leaf according to the invention. The invention can be applied to a rail vehicle (for example, railway vehicle, traction unit, locomotive, end car, power car, self-driving special vehicle for railway tasks, railcar or car (rail vehicle without a dedicated drive), etc.) or a motor vehicle (for example, passenger motor vehicle, passenger transport carriage, bus, ATV (All Terrain Vehicle, off-road/military vehicle), commercial vehicle, (heavy duty) truck, construction vehicle, special vehicle, construction machine, etc.), that is to say vehicles in general (including a wagon, that is to say a general vehicle without a dedicated drive). Furthermore, the invention can be applied to a boat, a ship, an aircraft (means of transportation) or a stationary door.

On account of a disintegration according to the invention of the exterior panel from the general vehicle door leaf (prior art) and a reconceptualization of the customer-specific vehicle door leaf according to the invention as a general vehicle door leaf at least plus exterior panel, a series of advantages arise. A considerably lower manufacturing complexity, improved quality, an increased functionality, a reduction of the requirements made of a supplier, a reduction of component diversity and a not insignificant cost saving result with a high level of integration of the components of the vehicle door leaf.

Adhesive bonding methods are restricted to a low level; therefore, high quality adhesive bonding qualification and adhesive bonding documentation are dispensed with. Complicated adhesive bonding audits and associated FAIs (First Article Inspection) are dispensed with. This results in a larger supplier pool for assembly of the exterior panel than in the case of a conventional exterior panel. Additional components are dispensed with, with a simultaneous increase in the functionality. Thus, in comparison with the prior art, a window frame which is adhesively bonded into an exterior panel and, in accordance with the invention, is a constituent part which is integrated directly into the vehicle door leaf frame is dispensed with. The exterior panel can be dismantled, repainted and replaced at any time simply without masking and without door removal, which results in lower Life Cycle Costs (LCC).

The exterior panel lies in front of the existing seals which do not have to be dismantled in the case of dismantling of the exterior panel. The exterior panel covers (corner) connections or connecting elements of the vehicle door leaf frame (for example, rivets, screws or possibly also welded seams which therefore do not have to be smoothed out). The presence of a thermal insulation between the general vehicle door leaf and the exterior panel results in improved thermal insulation of the vehicle door (no direct cold bridge on account of thermally poorly conducting spacer elements between the exterior panel and the general vehicle door leaf). A clearance between the exterior panel and the vehicle door leaf frame can optionally be filled with additional insulating material. Chasing or some other adaptation of the exterior panel (for example, contour, recessed grip, etc.) is possible without a modification of the vehicle door leaf frame.

In accordance with the invention, furthermore, a series of advantages arise for the general vehicle door leaf. Considerably lower manufacturing complexity, improved quality, an increase in a functionality, a reduction of demands made of suppliers, a reduction of component diversity and a considerable cost saving arise. In detail, all welding work can be dispensed with, and therefore also work which is necessary for this purpose, such as complicated straightening work and reworking (grinding, filling). Adhesive bonding work is restricted to a small amount, it being possible for a structural adhesive bonding method to be dispensed with (omission of a bonded-on or bonded-in exterior panel and/or a window frame), as a result of which high quality adhesive bonding qualification and adhesive bonding documentation are dispensed with. Associated First Article Inspections and welding audits and adhesive bonding audits are in turn dispensed with as a result.

In accordance with the invention, more precise manufacturing tolerances can be achieved than in the case of welding (no welding distortion). Mold costs for cast parts and additional components are dispensed with, with a constant or increased functionality. Moreover, a larger supplier pool for manufacturing the extruded profiles and machining and assembly (riveting, screwing) results than in the case of a welded construction. In accordance with the invention, all corner connection parts are dispensed with by way of the integrated radii and/or plug-in lugs on the frame hollow profiles for the at least one circumferential door seal and the circumferential window seal, no offset being produced at the plug-in lugs. The sealing compound and/or the coating make/makes pressure-tightness of the vehicle door leaf possible, even without an exterior panel.

In the following text, the invention is described in greater detail on the basis of exemplary embodiments with reference to the appended diagrammatic drawing which is not true to scale. Sections elements, structural parts, units, outlines and/or components which have an identical, univocal or analogous configuration and/or function are labeled by way of the same designations in the description of the figures (see below), the list of designations, the patent claims and in the figures (figs.) of the drawing. Furthermore, a possible alternative which is not described in the description of the invention (see above), is not shown in the drawing and/or is not conclusive, a static and/or kinematic reversal, a combination, etc. with respect to the exemplary embodiments of the invention and/or a component, an outline, a unit, a structural part, an element or a section thereof, can be gathered from the list of designations and/or the description of the figures.

In the case of the invention, a feature (section, element, structural part, unit, component, function, size, etc.) can be of either positive (that is to say, present) or negative (that is to say, absent) configuration, a negative feature not being described explicitly as a feature if importance is not attached in accordance with the invention to the fact that it is absent.

A feature of said specification (description, list of designations, patent claims, drawing) can be used not only in an indicated way, but rather also in another way (isolation, combination, replacement, addition, on its own, omission, etc.). In particular, it is possible to replace, add or omit a feature in the patent claims and/or the description on the basis of a designation and a feature which is assigned to the former, or vice versa, in the description, the list of designations, the patent claims and/or the drawing. Moreover, a feature in a patent claim can be interpreted and/or specified in greater detail as a result.

The features of said specification can also be interpreted as optional features (in view of the (usually unknown) prior art); that is to say, each feature can be interpreted as an optional, arbitrary or preferred feature, that is to say as a non-obligatory feature. Thus, it is possible for a feature, possibly including its periphery, to be separated from an exemplary embodiment, it then being possible for said feature to be transferred to a generalized concept of the invention. The absence of a feature (negative feature) in an exemplary embodiment shows that the feature is optional in relation to the invention. Furthermore, in the case of a specific term for a feature, a generic term for the feature can also be inferred (possibly a further hierarchical breakdown into subgenus, section, etc.), as a result of which a generalization of one or said feature is possible, for example with consideration of equivalent technical effect and/or equivalence. In the merely exemplary figures:

DETAILED DESCRIPTION OF THE INVENTION

Figure 1:
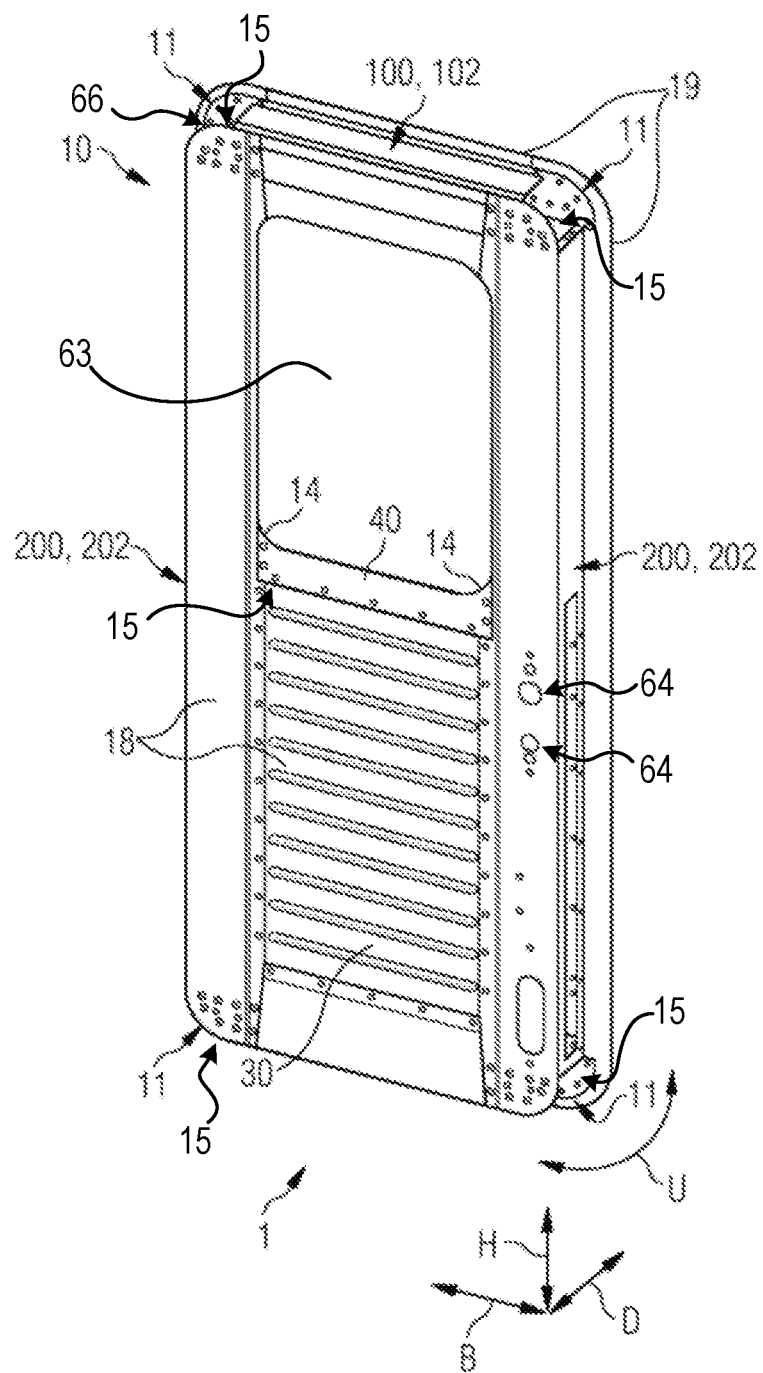
FIG. 1 shows a perspective view of one exemplary embodiment of a general vehicle door leaf based on a vehicle door leaf frame for a customer-specific vehicle door leaf according to the invention with an exterior panel according to the invention.

The invention is described in greater detail in the following text on the basis of exemplary embodiments of one embodiment of one variant of a customer-specific vehicle door leaf 0 according to the invention on the basis of a general vehicle door leaf 1 according to the invention with a vehicle door leaf frame 10 according to the invention for a rail vehicle (rail vehicle door leaf 0/1, rail vehicle door leaf frame 10). The invention is not restricted, however, to a variant of this type, to embodiments of this type and/or to the exemplary embodiments which are described in the following text, but rather is of more fundamental nature, with the result that the invention can be applied to all vehicles (see above). The drawing shows only those sections of a subject of the invention which are necessary for a comprehension of the invention.

Furthermore, the description of the invention on the basis of the drawing relates in the following text to a width direction B or a width axis B, to a thickness direction D or a thickness axis D, and to a vertical direction H or a vertical axis H, and to a circumferential direction U of the vehicle door leaf frame 10 or the vehicle door leaf 0/1. Although the invention has been described and illustrated in greater detail by way of preferred exemplary embodiments, the invention is not restricted by way of the disclosed exemplary embodiments. Other variations can be derived herefrom and/or from the above (description of the invention), without departing from the scope of protection of the invention.

Figure 2:
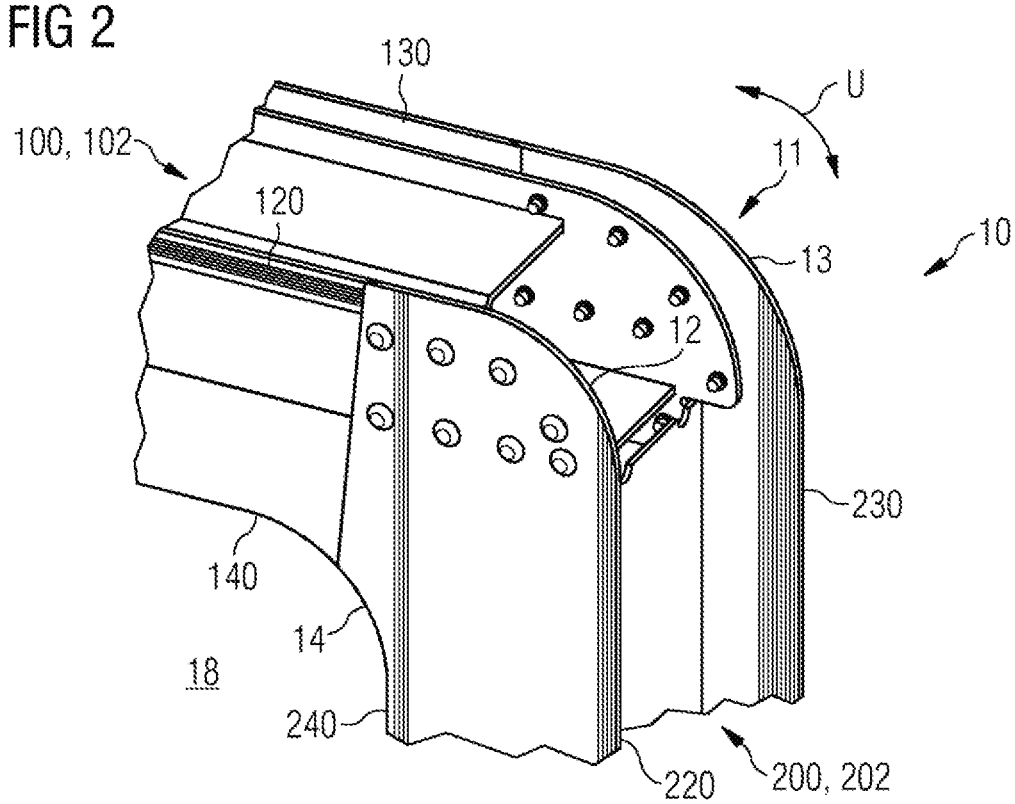
FIG. 2 shows a three-dimensional view, which is more detailed than FIG. 1, of a cut-away, right-hand upper corner region of the vehicle door leaf frame from FIG. 1.
Figure 4:
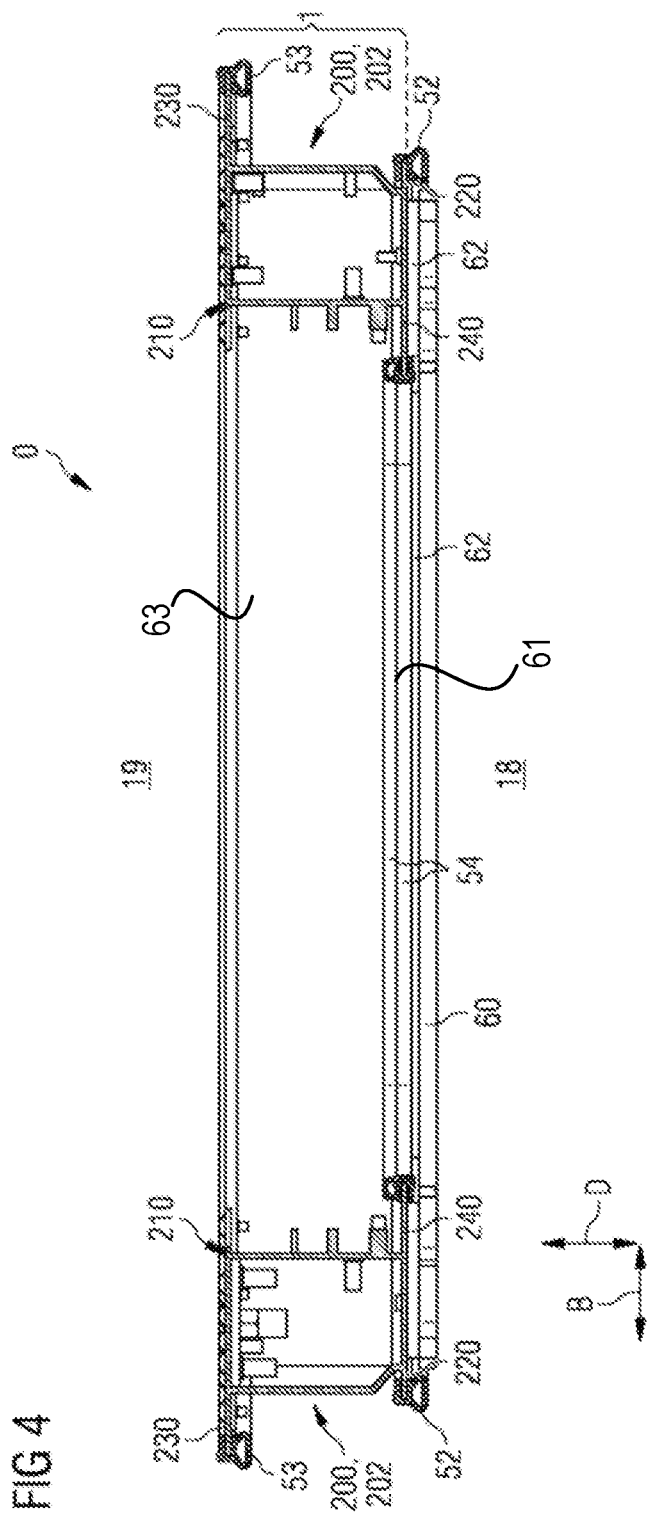
FIG. 4 shows a two-dimensional sectional view of the vehicle door leaf frame from FIG. 1 including an exterior panel according to the invention, a customer-specific vehicle door leaf being shown sectioned in a region of its cut-out 61 for a stowage shaft window 63.
Figure 5:
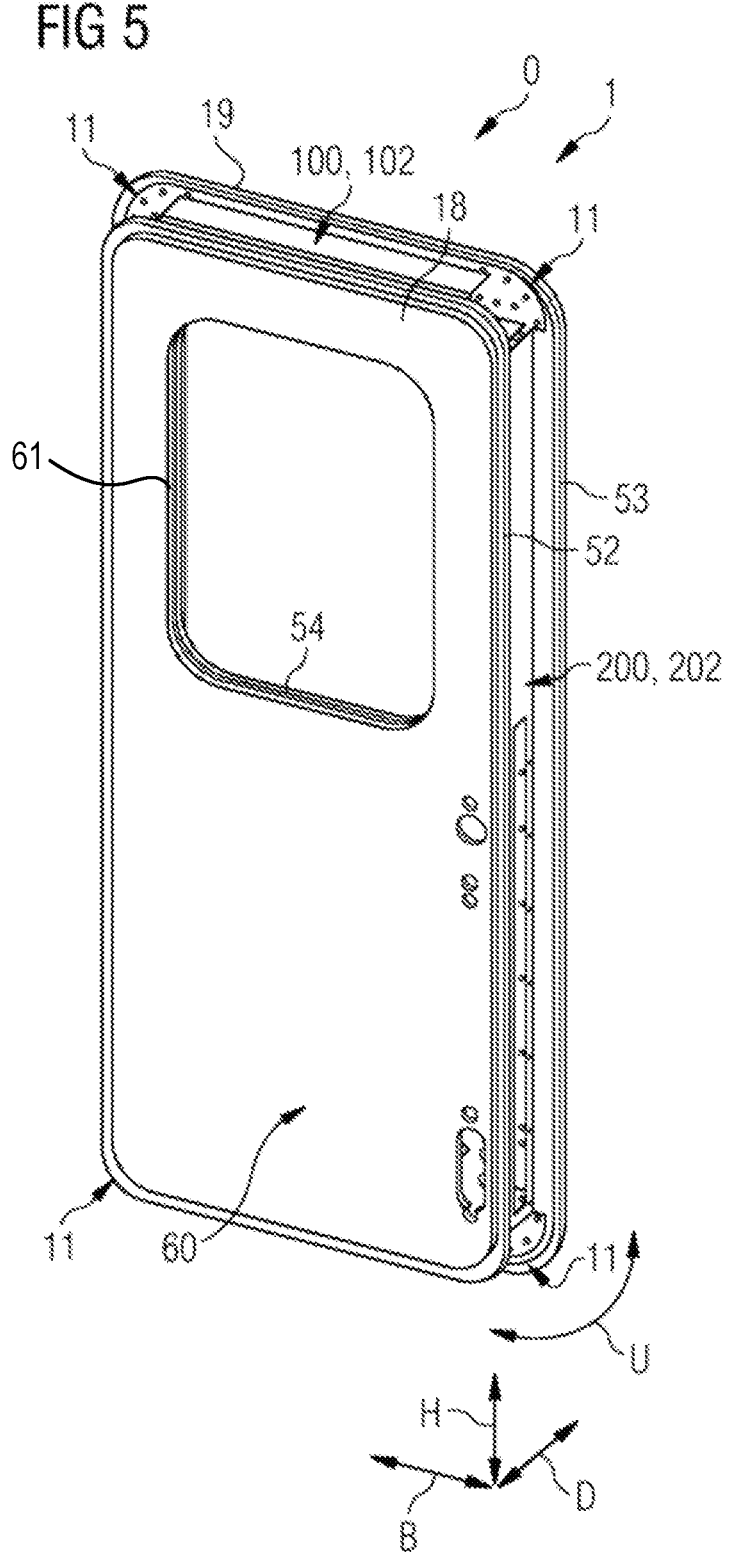
FIG. 5 shows a perspective view (analogous with respect to FIG. 1) of the customer-specific vehicle door leaf, the customer-specific vehicle door leaf having one exemplary embodiment of the exterior panel according to the invention on its outer side.

FIG. 1 shows the general vehicle door leaf 1, without at least one plug-on seal, a stowage shaft window 63 and a mechanism for the latter, an interior trim panel, an exterior panel (60 of FIGS. 4 and 5), a recess for a lock device 64 and/or a bearing device 66, etc., based on the vehicle door leaf frame 10, two corner regions 11 of the vehicle door leaf frame 10 being shown in greater detail in FIG. 2 (right-hand upper corner region 11 of FIG. 1) and 3 (left-hand upper corner region 11 of FIG. 1). In accordance with the invention, the vehicle door leaf frame 10 is configured as a profile frame 10 which preferably has four frame hollow profiles 102, 102; 202, 202). Another number of frame hollow profiles 102, . . . ; 202, . . . ; . . . can possibly be used.

In accordance with the invention, the frame hollow profiles 102, . . . ; 202, . . . ; . . . come from two or precisely two hollow profiles 100, 200 of different configuration, their cross sections (110, 120, 130, 140; 210, 220, 230, 240; cf., in particular, FIG. 3 with FIG. 4) being of different configuration, in particular, with regard to shape and size. In the present case, two horizontal, inner frame hollow profiles 102, 102 and two vertical, outer frame hollow profiles 202, 202 are used for the vehicle door leaf frame 10. It is of course possible to swap this, that is to say to use vertical, inner frame hollow profiles and horizontal outer frame hollow profiles.

The following comments relate substantially only to a single inner frame hollow profile 102 and a single outer frame hollow profile 202 and a common corner region 11 of said two frame hollow profiles 102, 202. The following comments can be applied analogously, however, to the other frame hollow profiles 102, 202 (preferably two) and the other corner regions 11 (preferably three).

The inner frame hollow profile 102 (cf. FIG. 3) has a base profile 110 with a preferably closed, mainly "rectangular" or mainly "square" cross section. Here, the cross section is "pentagonal", a corner (plan view of the cross section: top left) of a rectangle or square being of beveled configuration (pentagonal, mainly rectangular cross section). That is to say, the base profile 110 is configured as a polygonal tube or pentagonal tube with a mainly rectangular or square cross section. Here, rounded portions can of course also be provided. Other shapes, such as triangular, hexagonal, polygonal shapes, possibly with rounded portions; round shapes, etc., can of course be used.

Furthermore, the base profile 110 of the inner frame hollow profile 102 preferably has three lug-shaped projections 120, 130, 140 which project away from it in the vertical direction H, each projection 120, 130, 140 preferably being configured as an extension of a side wall of the base profile 110, which side wall relates to said projection. All lug-shaped projections 120, 130, 140 preferably do not lie at least with a free section in a plane of that side wall of the base profile 110 which relates to the respective projection 120, 130, 140. Said sections are preferably arranged, however, parallel to the relevant side wall, to which they are preferably connected integrally (parallel offset).

Thus, the base profile 110 has a preferably radially outer, front (outer side 18 of the vehicle) profile web 120 which is preferably recessed substantially completely from the relevant side wall of the base profile 110. The profile web 120 can have a seal edge or can be configured as a seal edge of this type. Said seal edge can have grooving. Furthermore, the base profile 110 has a preferably radially outer, rear (inner side 19 of the vehicle (cab, carbody)) profile web 130 which is preferably recessed merely in sections from the relevant side wall of the base profile 110. The profile web 130 can have a seal edge or can be configured as a seal edge of this type. Said seal edge can likewise have grooving.

Moreover, the base profile 110 has a preferably radially inner, front profile limb 140 which is preferably recessed substantially completely from the relevant side wall of the base profile 110. The profile limb 140 can have a seal edge or can be configured as a seal edge of this type. Said seal edge can once again likewise have grooving. The radially outer, front profile web 120 and the radially inner, front profile limb 140 preferably lie in one plane. Here, a respective seal edge serves preferably for receiving a plug-on seal 52, 53, 54 (cf. FIG. 4).

Here, the outer frame hollow profile 202 (cf. FIG. 4) is configured with a substantially analogous shape with respect to the inner frame hollow profile 102, its preferably three lug-shaped projections 220, 230, 240 (radially outer, front profile web 220, radially outer, rear profile web 230, radially inner, front profile limb 240) not projecting from it in the vertical direction H, however, but rather in the width direction B. Furthermore, all lug-shaped projections 220, 230, 240 preferably lie at least with a section, in particular completely, in a plane with that side wall of the base profile 210 which relates to the respective projection 220, 230, 240 and to which they are preferably connected integrally (no parallel offset). Furthermore, the radially outer, front profile web 220 and the radially inner, front profile limb 240 preferably lie in one plane.

Figure 3:
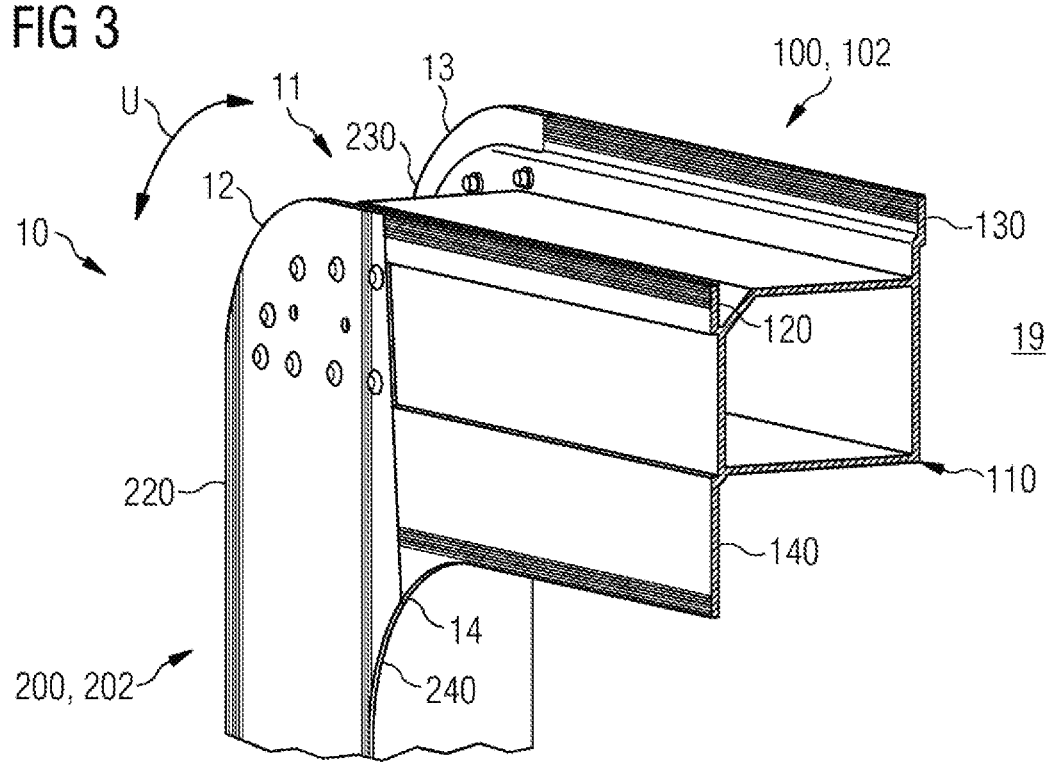
FIG. 3 shows a three-dimensional view, which is more detailed than FIG. 1, of a cut-away, left-hand upper corner region of the vehicle door leaf frame from FIG. 1.

The outer frame hollow profile 202 is configured in such a way that the base profile 102 of the inner frame hollow profile 102, possibly including a bonded section, for example, of its outer, rear profile web 130 (cf. FIG. 3), can be received between two side walls of the outer frame hollow profile 202 with a clearance fit or a transition fit (cf. FIGS. 2 and 3). That is to say, the two frame hollow profiles 102, 202 are configured such that they can be plugged into one another with their longitudinal end sections. Said two frame hollow profiles 102, 202 which relate to one another can be riveted and/or screwed to one another in their mutual overlaps (corner regions 11). Welded seams/welded spots can possibly be used in addition.

Furthermore, mutual linear contact regions result between the profile webs 120, 220; 130, 230 (four) which relate to one another and the profile limbs 140, 240 (two) which relate to one another. In said regions, the two frame hollow profiles 102, 202 which relate to one another are preferably fitted in a complementary manner, with the result that they configure seal edges which preferably run around substantially completely on the profile webs 120, 220; 130, 230 and have substantially no offset in the thickness direction D. It is possible, in particular, to dispense with one fitted connection or all fitted connections.

The outer frame hollow profile 202 is preferably machined in its two corner regions 11 in such a way that (outer) radii 12, 13 (plug(-in) lugs 12, 13) are provided there for the preferably substantially completely circumferential door seals 52, 53 ((plug-in) seals 52, 53). Furthermore, the outer frame hollow profile 202 and, in a corresponding manner thereto, the inner frame hollow profile 102 and, a second time, the outer frame hollow profile 202 and, in a manner which corresponds thereto, a center strut 40 (see below, alternative thrust plate 30, see below) are preferably machined in such a way that radii 14 (plug(-in) lugs 14) are provided there for the preferably substantially completely circumferential window seal 54 ((plug-in) seal 54). The plug-in lugs 12, 13, 14 can have grooving, in order to increase retention of the seals 52, 53, 54.

In order that a (stowage shaft) window can be set up between the outer frame hollow profiles 202, 202, the possibly beaded center strut 40 is riveted and/or screwed onto the two frame hollow profiles 202, 202 at a corresponding level. A preferably beaded thrust plate 30 is riveted or screwed onto the two outer frame hollow profiles 202, 202, the center strut 40 and the lower inner frame hollow profile 102 between the center strut 40 and the lower inner frame hollow profile 102. The center strut 40 can possibly be configured in one piece/integrally with the thrust plate 30. In addition or as an alternative to at least one bead, the thrust plate 30 can have at least one other reinforcing device.

In all corner regions 11, a sealing compound 15 can be introduced between the frame hollow profiles 102, 202 which relate to one another there during the plugging together, in order that the vehicle door leaf frame 10 can be configured in a pressure-tight manner. The thrust plate 30 and/or the center strut 40 are/is preferably likewise provided with sealing compound 15 on the vehicle door leaf frame 10. Moreover, sealing compound 15 is possibly likewise provided between the thrust plate 30 and the center strut 40. In addition or as an alternative, the transitions between the components which relate to one another (frame hollow profiles 102, 102; 202, 202—thrust plate 30—center strut 40) and/or the entire vehicle door leaf frame 10 (possibly on one side, outer side 18 (on the outside and/or on the inside)) can be sealed retroactively, possibly also additionally, with a coating, with the result that the general vehicle door leaf 1 is pressure-tight even without an exterior panel 60.

Figure 6:
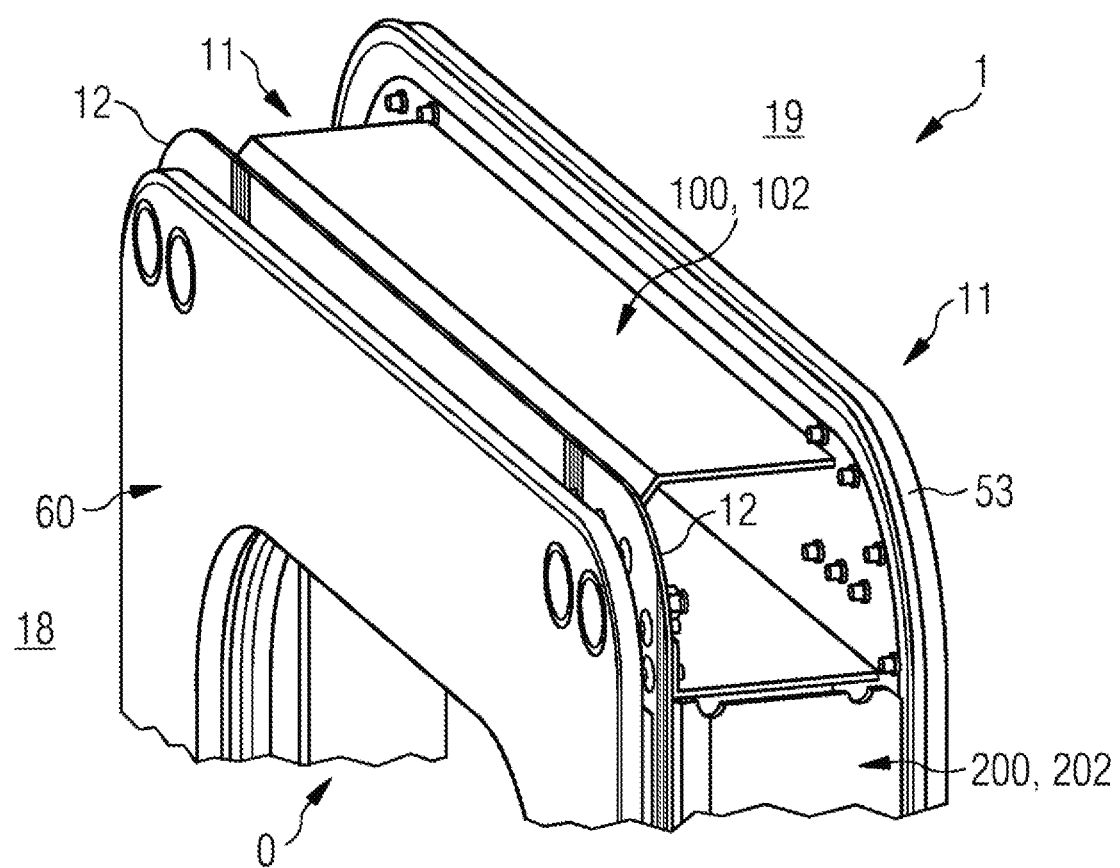
FIG. 6 shows a three-dimensional view, which is more detailed than FIG. 5, of a cut-away, upper region of the vehicle door leaf frame from FIG. 5.

In accordance with the invention, one embodiment of the customer-specific vehicle door leaf 0 (FIGS. 4 to 6) has the above-described general vehicle door leaf 1 and a panel 60 which is configured, for example, as an aluminum sandwich panel 60, a GFRP panel 60, etc. Here, the general vehicle door leaf 1 itself is of pressure-tight and/or water-tight configuration, the panel 60 being fastened as an exterior panel 60 to the vehicle door leaf frame 10 on the outer side 18. The exterior panel 60 is preferably configured as an exterior panel 60 which can be dismantled simply, a mechanical connection of the exterior panel 60 to the vehicle door leaf frame 10 being of simply releasable configuration. This can take place by way of screwing or a plug-in connection. Furthermore, it is possible to adhesively bond or to rivet the exterior panel 60.

A thermal insulation 62 can be set up (cf. FIG. 4) between the exterior panel 60 and the general vehicle door leaf 1 or the vehicle door leaf frame 10. In accordance with the invention, the exterior panel 60 can cover at least one or two corner regions 13, or all corner regions 13 of the vehicle door leaf frame 10. It is preferred, in particular, that the exterior panel 60 covers substantially the entire general vehicle door leaf 1 on one side 18, 19, in particular the outer side 18. The exterior panel 60 is of course cut out (61 of FIGS. 4 and 5) in a window region of the customer-specific vehicle door leaf 0.

The invention claimed is:

1. A customer-specific rail vehicle door leaf for an access door, the vehicle door leaf comprising:
   a general vehicle door leaf having a load-bearing vehicle door leaf frame and being pressure-tight and water-tight, with said vehicle door leaf frame itself having a pressure-tight and water-tight configuration;
   said vehicle door leaf frame being formed of four frame hollow profiles constituting said vehicle door leaf frame, said frame hollow profiles being produced from two different hollow profiles;
   said general vehicle door leaf being configured as a completely functional vehicle door leaf and having a stowage shaft window including a mechanism, a plug-on seal, an interior trim panel, a bearing device, and a recess for a lock device;
   an exterior panel mounted on an outside of said general vehicle door leaf or of said vehicle door leaf frame;
   a mechanical connection of said panel to said general vehicle door leaf or to said vehicle door leaf frame being a simply releasable configuration, enabling said panel to be dismantled from said general vehicle door leaf without damage to, or destruction of, a part of said general vehicle door leaf that is connected to said panel; and
   said interior trim panel mounted to said general vehicle door leaf.

2. The vehicle door leaf according to claim 1, wherein:
   said exterior panel is fastened by screwing or plugging to said general vehicle door leaf or said vehicle door leaf frame; or
   a thermal insulation is disposed between said panel and said general vehicle door leaf or said vehicle door leaf frame, or
   said panel is an aluminum sandwich panel or a glass fiber reinforced polymer panel.

3. The vehicle door leaf according to claim 1, wherein:
   frame hollow profiles which relate to one another are plugged or fitted into one another in a corner region of said vehicle door leaf frame;
   frame hollow profiles which relate to one another are riveted, screwed or welded to one another in the corner region of the vehicle door leaf frame; and
   seal edges which relate to one another of frame hollow profiles which relate to one another are substantially flush in a circumferential direction of said vehicle door leaf frame.

4. The vehicle door leaf according to claim 1, wherein said panel:
   is formed to cover a corner region of said vehicle door leaf frame;
   has a cut-out in a window region of the vehicle door leaf; and/or
   is formed to cover substantially an entire said general vehicle door leaf on an outer side.

5. The vehicle door leaf according to claim 3, wherein:
   said frame hollow profiles comprise two inner frame hollow profiles and two outer frame hollow profiles;
   said inner frame hollow profiles are of mutually identical configuration; and
   said outer frame hollow profiles are of mutually identical configuration.

6. The vehicle door leaf according to claim 5, wherein:
   a longitudinal end section of a base profile of an inner frame hollow profile is received between two side walls of an outer frame hollow profile;
   profile webs which relate to one another or profile limbs which relate to one another of said frame hollow profiles are flush in the circumferential direction of said vehicle door leaf frame; or
   profile webs which relate to one another or profile limbs which relate to one another of said frame hollow profiles which relate to one another are fitted in a mechanical contact region.

7. The vehicle door leaf according to claim 1, wherein:
   said general vehicle door leaf has a thrust plate at least on one side and a center strut at least on one side;
   said thrust plate and said center strut are set up between said vertical frame hollow profiles of said vehicle door leaf frame.

8. The vehicle door leaf according to claim 7, wherein:
   said thrust plate and said center strut are riveted or screwed to a frame hollow profile at least on one side;
   sealing compound is disposed between said thrust plate and said center strut and at least one frame hollow profile;
   said thrust plate and said center strut and at least one frame hollow profile are coated;
   said center strut is riveted or screwed to said thrust plate; or
   sealing compound is disposed between the thrust plate and the center strut.

9. A rail vehicle, comprising a vehicle cab or car body including a customer-specific vehicle door leaf according to claim 1.

* * * * *